Dec. 15, 1931.  A. H. LYON  1,836,675
TAPPING MACHINE
Filed July 20, 1929   5 Sheets-Sheet 1

INVENTOR.
ARTHUR H. LYON
BY
ATTORNEY

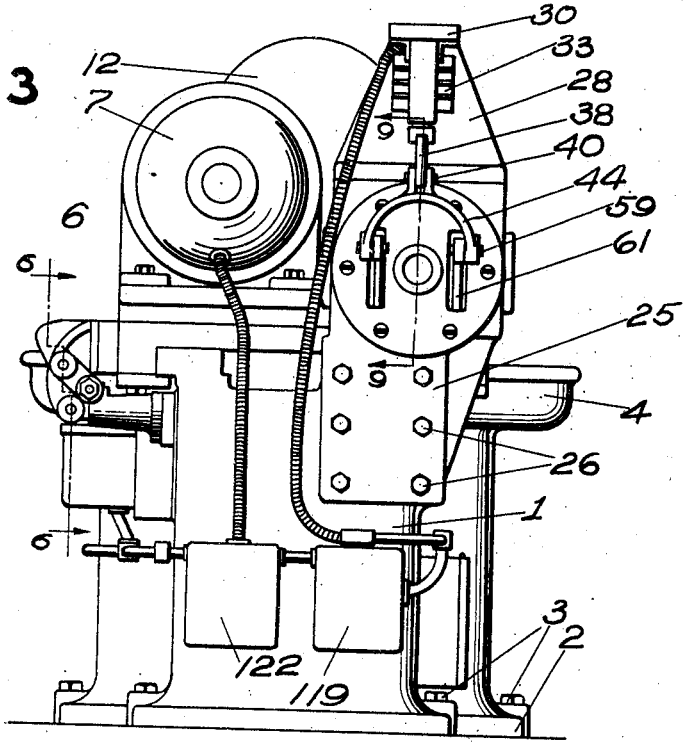
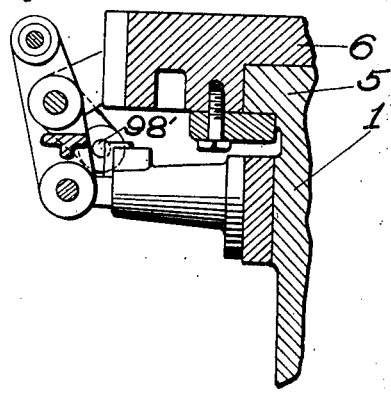
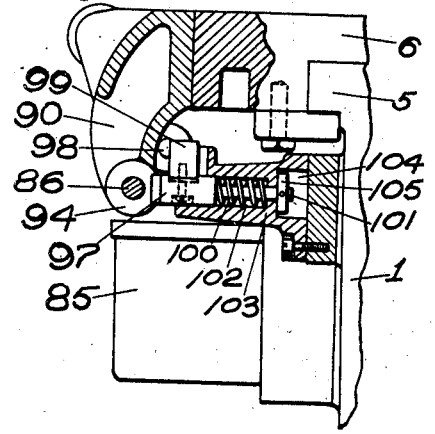

Dec. 15, 1931.　　　A. H. LYON　　　1,836,675
TAPPING MACHINE
Filed July 20, 1929　　5 Sheets-Sheet 3

INVENTOR.
ARTHUR H LYON
BY
ATTORNEY.

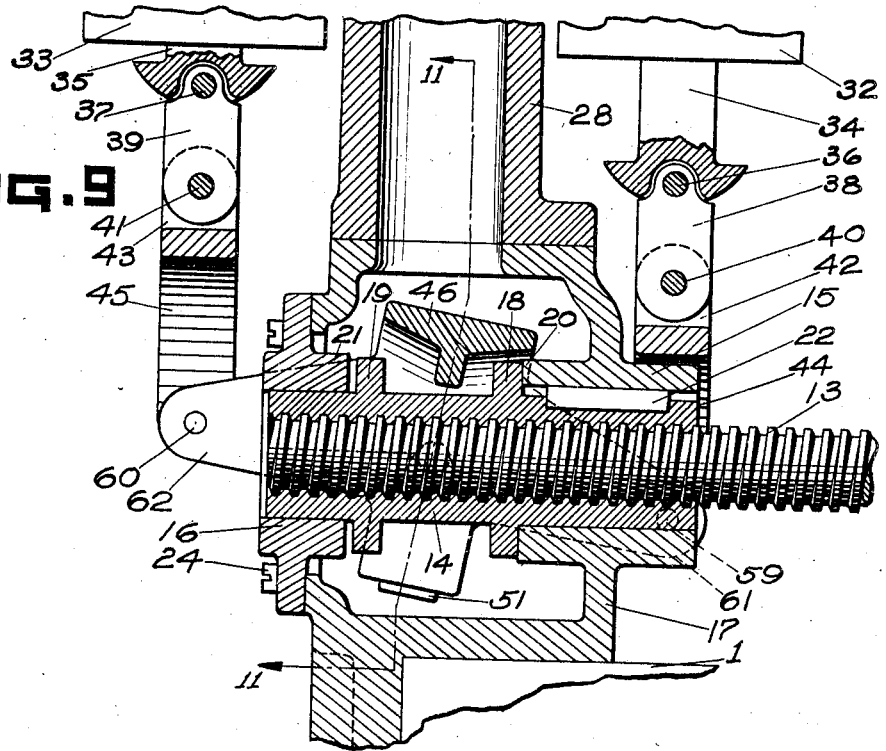
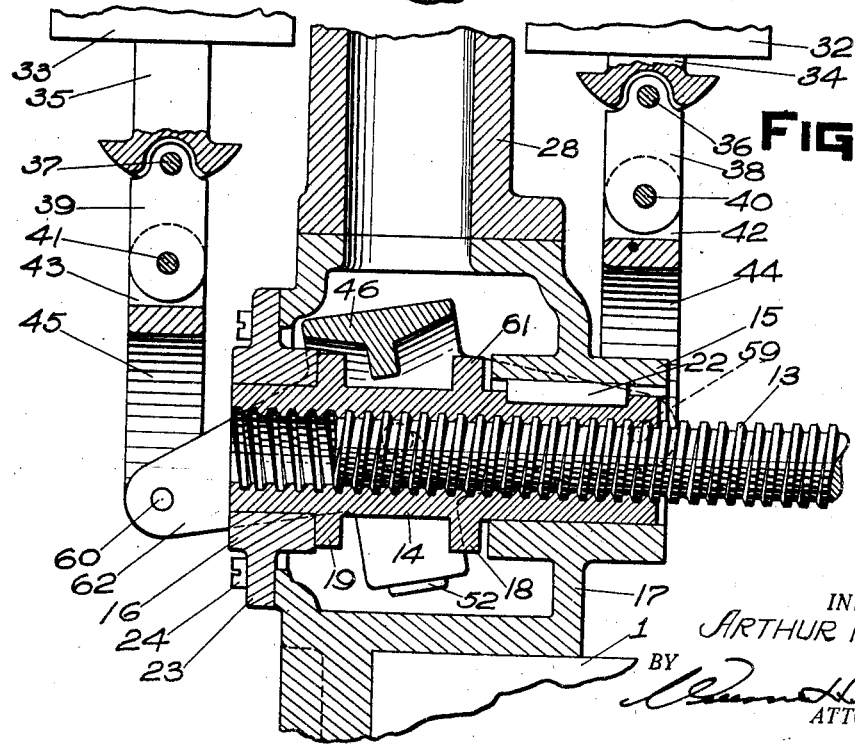

INVENTOR.
ARTHUR H. LYON
BY
ATTORNEY.

Patented Dec. 15, 1931

1,836,675

UNITED STATES PATENT OFFICE

ARTHUR H. LYON, OF ROCKFORD, ILLINOIS, ASSIGNOR TO THE INGERSOLL MILLING MACHINE COMPANY, OF ROCKFORD, ILLINOIS, A CORPORATION OF ILLINOIS

TAPPING MACHINE

Application filed July 20, 1929. Serial No. 379,737.

The present invention relates in general to machine tools and has particular reference to an improvement in tapping machines of the power driven multiple type.

To better explain the salient features of the invention it will be recalled that prior to the introduction of the present improvements considerable difficulty had been experienced in the operation of multiple spindle tapping machines due primarily to the frequent destruction of the threads at the edge of the hole as a result of one or more of the tools finishing its backing up feed ahead of the others. With all of the tools collectively assembled in the head, the head could not be moved to clear the tools from the work until each and every one of the tools had completed its cycle of operation. This would leave those tools which finished ahead of others continuing to rotate at the edge of the tapped thread and in wiping contact therewith.

The principal object of this invention is to provide means for automatically clearing each tool from the work instantly as it completes its backing up feed so that those tools which finish ahead of others will in no way injure the threads they tap by continued rotation in the edge of the hole.

Other objects of the invention will appear hereinafter, the novel features and combinations being set forth in the appended claims.

Obviously, those skilled in the art may make various changes in the construction of the mechanism and the specific method described without departing from the spirit and scope of the invention as defined by the subjoined claims, and I therefore do not wish to be limited to the precise embodiment shown.

The particular embodiment shown in the accompanying drawings is an automatic electric control adaptation. This type has been selected for illustrating the present case and in my co-pending case Serial No. 381,156 filed July 26, 1929 I am showing and describing a mechanical mechanism for accomplishing substantially the same objective. As the present case is the first filed, the generic claims will be made herein and the co-pending case treated as a companion application for the divisional subject matter.

In the accompanying five sheets of drawings,

Fig. 3 is a view in elevation of the rear end of the machine.

Fig. 4 is a detail view, partly in section, taken on the line 4—4 Fig. 1.

Fig. 5 is a detail view partly in section taken on the line 5—5 Fig. 1.

Figure 7:
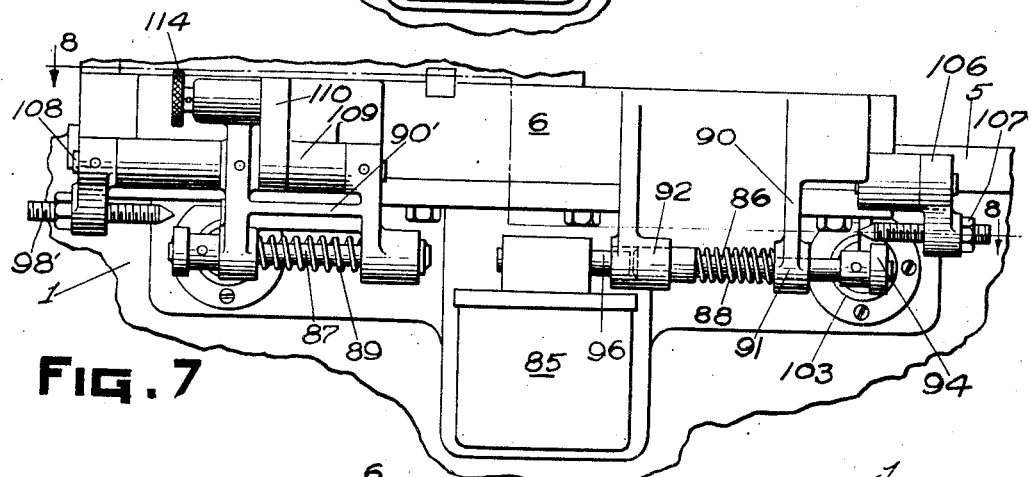
Fig. 7 is a view similar to Fig. 6 but showing the limit switch in an opposite position of operation.
Figure 8:
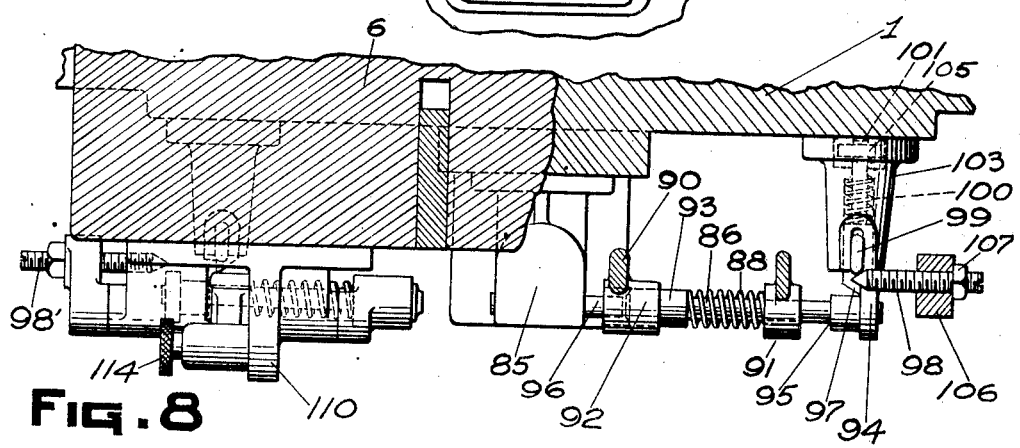

Fg. 8 is a view in cross section taken on the line 8—8 Fig. 7.

Fig. 9 is a view in cross section taken on the line 9—9 Fig. 3.

Fig. 10 is a view similar to Fig. 9 but showing the feed screw nut and its companion parts in a different position of operation.

Figure 11:
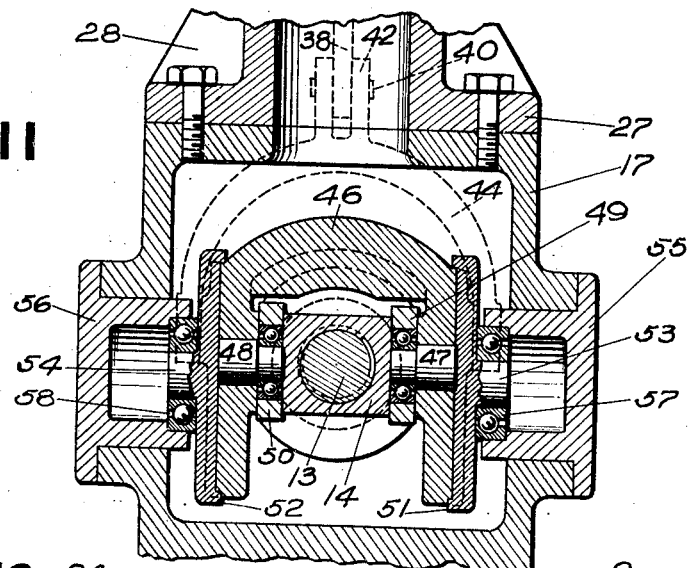

Fig. 11 is a view in cross section on the line 11—11 Fig. 9.

Figure 2:
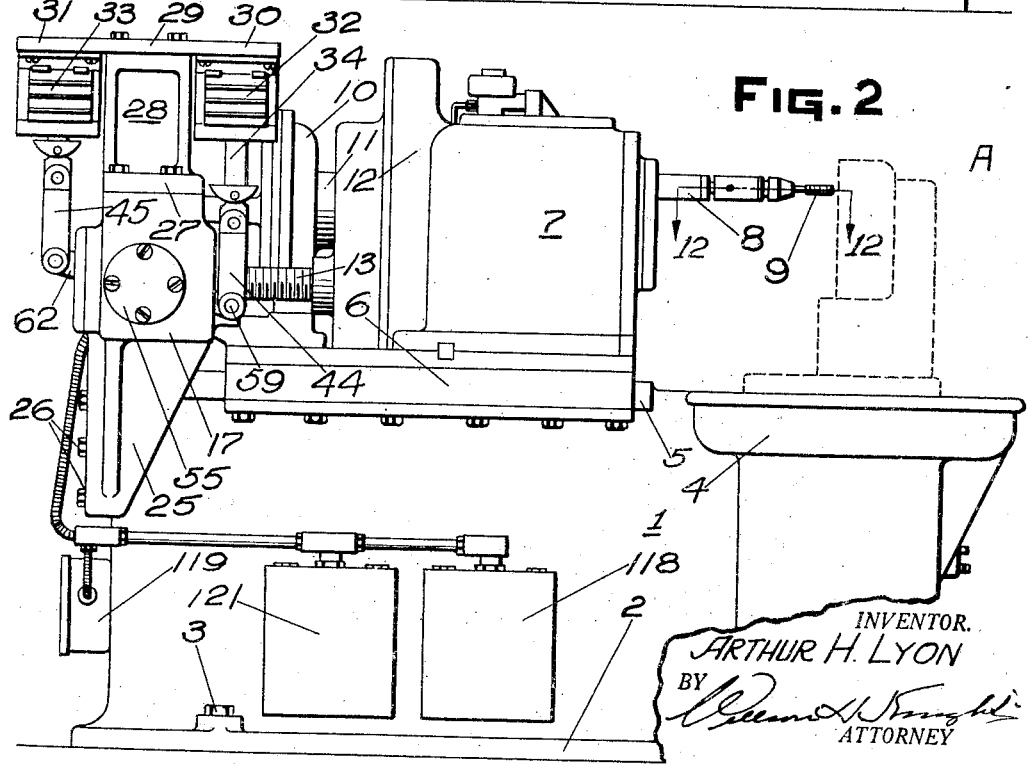
Fig. 2 is a view similar to Fig. 1 looking at the opposite side of the machine.
Figure 6:
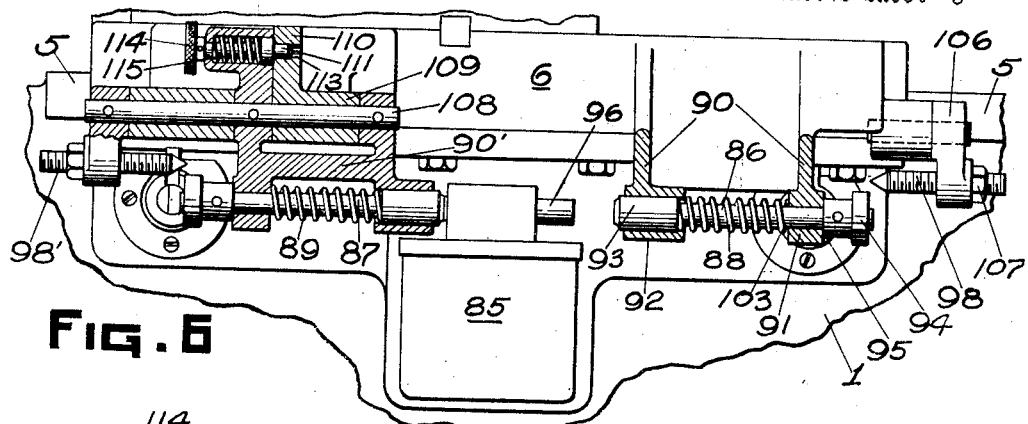
Fig. 6 is a view partly in section and partly in elevation taken on the line 6—6 Fig. 3.
Figure 12:
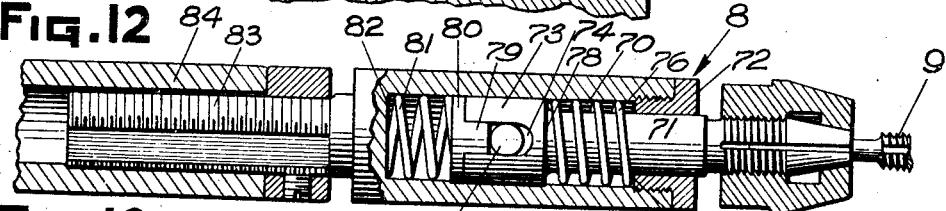

Fig. 12 is a view in longitudinal section of the assembly of one of the tool chucks, the view being taken on the line 12—12 Fig. 2 and showing the position of the chuck parts as the tool approaches the work.

Figure 13:
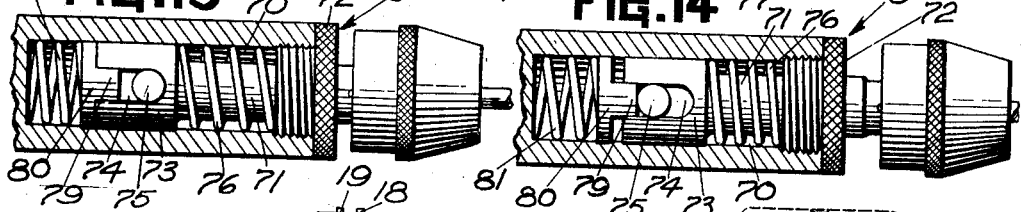
Figure 14:
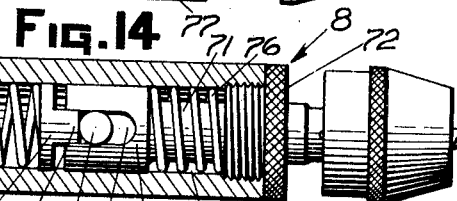
Figure 15:
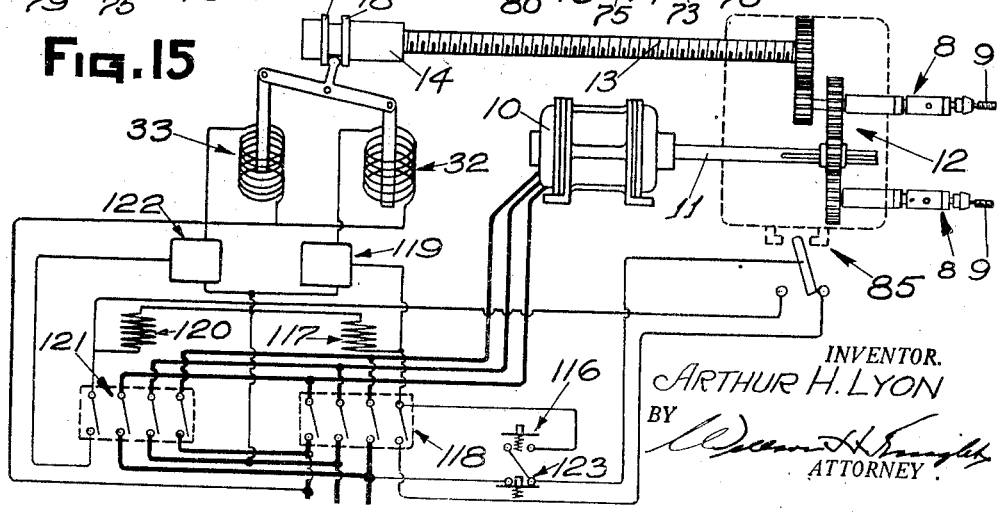

Figs. 13 and 14 are views in longitudinal section of a portion of the length of the chucks and showing respectively the positions of the parts when the tool is operating in the work and while it is backing up in the work, and Fig. 15 is a view of the wiring diagram and also showing diagrammatically the feed screw and other parts of the automatic tension device.

Referring now to the drawings in detail, 1 represents the machine bed frame which is made with a base flange 2 for anchoring the machine to a floor or other surface by means of bolts or the like 3. The bed may be made approximately oblong in design with the front end conforming to a modified pedestal in shape and serving as a table for supporting the work A on which the machine is to operate. For the present purpose the work is shown as a cylinder block head for an internal combustion engine.

Arranged upon the bed frame 1 to the rear of the work support 4 are slides or ways 5 on which the tool carriage 6 is mounted to slide. The carriage 6 carries the multiple tool head 7 from which the chucks 8 (only one being shown in the elevation views) for the tapping tools 9 project in a horizontal plane. Also mounted upon the carriage 6 in back of the head 7 is an electric motor 10 the shaft 11 of which is connected through the reduction gearing 12 with the driving mechanism in the head 7 for driving the tool chucks 8 all in the same direction of rotation and at the same speed.

Driven off the gear system in the head 7 is a feed screw 13 the rearwardly extending end of which is threaded in a nut 14. The threaded engagement of the feed screw in this nut effects the desired reciprocation of the carriage for moving the tools into the work during the tapping operation and backing them out of work. The motor 10 is reversible which reverses the direction of rotation of the tools as well as the feed screw 13.

The nut 14 is made with a relatively long internally threaded barrel or sleeve the opposite ends of which are confined with freedom of sliding movement in spaced bearings 15 and 16 in the casting 17. Formed intermediate the ends of the nut and in spaced relation are two annular flanges 18 and 19. These flanges are spaced apart so that they occupy the space between the shoulders 20 and 21 on the inside of the bearings 15 and 16 to leave a predetermined amount of play or lost motion in opposite directions. The bearing 15 is cast integral with the casting 17 and the forward end of the nut sleeve is keyed therein as at 22. The bearing 16 is made as a bushing with an attaching flange 23 provided with metal screws 24 for securing the same in place. The purpose of the play for the nut will be fully explained in the description of the operation.

The casting 17 provides a box-like housing and the same is cast with a bracket arm 25 for securing the parts in upon the bed 1 with the bolts 26 aiding this capacity.

The top of the casting 17 has a separate cover 27 which is bolted on and includes the integral webbed upright 28 which supports the cross piece 29, the opposite overhanging ends 30 and 31 of which suspend the solenoids 32 and 33.

The solenoids 32 and 33 have downwardly depending stems 34 and 35 which are pivoted as at 36 and 37 to links 38 and 39 which in turn are pivoted as at 40 and 41 to the attaching ears 42 and 43 on each of the yokes 44 and 45.

A transversely disposed semi-circular rocker ring 46 straddles the feed screw and is fulcrumed at opposed sides of the nut 14 by means of the stud shafts 47 and 48. The reduced diameters of the stud shafts are equipped with ball bearing assemblies 49 and 50 which seat between the parallel depending sides of the rocker ring and the sides of the nut. Fixed to the outer faces of the depending sides of the rocker ring are plate members 51 and 52 which have centrally located and integral trunnion ears 53 and 54 extending into the casting 17 through openings made to receive them in cupped plugs 55 and 56. The inner extremities of these cupped plugs carry ball bearings 57 and 58 in which the ears 53 and 54 are trunnioned. It will thus be seen that the rocker ring is trunnioned within the casting and that, as a result of positioning the stud shafts slightly off center with respect to the trunnion bearings, oscillation or a rocking motion imparted to the rocker ring will cause the nut to slide in either of two directions.

The ends of the yokes 44 and 45 are pivoted as at 59 and 60 to each of a pair of arms 61 and 62 which project forwardly and rearwardly from opposite sides of the rocker ring.

Referring now to Figs. 12, 13 and 14, it will be seen that the forward section of the chuck assembly is fashioned to provide a closed internal bore 70 into which the collet 71 extends through a central opening in the threaded plug 72. The inner extremity of the collet is provided with an enlarged diameter 73 which has a sliding fit in the bore 70 and is further made with an open slot 74 for the reception of a cross pin 75 which is fixed across the bore. A spring 76 is coiled around the collet between the shoulder 77 provided by the inner end of the plug 72 and the shoulder 78 made by the enlarged diameter 73. Formed as a companion part for the diameter 73 of the collet and with a transverse tongue 79 thereon, seating in the slot 74 is an abutment 80 for a second spring 81. The spring 81 is coiled oppositely to the spring 76 and it is also confined in the bore 70 between its abutment 80 and the closed end 82 of the bore. 83 is the shank which is locked in the drive sleeve part 84 and into the opposite end of which the drive spindle is received.

Normally, as shown in Fig. 12, the two springs are bucking each other, so to speak, when the tools are moved into contact with the work. The collet 71 is moved rearwardly in the bore 70 against the resistance offered by the spring 81 until the pin 75 abuts against the end of the slot. Should the work be so soft as to permit the tool to commence tapping without overcoming the resistance of the spring 81, the spring will simply serve as a resilient resistance to cushion the feeding action. This is also true at the commencement of the tapping operation even with hard metal as the tool in coming in contact with the work will be yieldably fed until the pin 75 is moved against the end of the slot. It will thus be seen that the spring 81 provides a resilient resistance which yieldably presents the tool to the work and exerts substantially the same cushioning or tensioning action throughout the tapping operation.

The spring 76 serves in substantially the same capacity for the backing up operation and in addition thereto it kicks each tap away from the hole immediately upon completion of its backing up operation and regardless of whether all the taps are through at the same time. This and other important features in the principle of operation of the invention will be more fully explained hereinafter.

The combination includes a limit switch for reversing the motor at the limit of both the tapping and backing up operations. This switch is indicated as at 85, the same being mounted as a stationary device on the side of the machine bed. The switch per se may be purchased on the open market and is known to the trade as a "G. E. limit switch." The mechanism which actuates the switch is carried by the carriage and comprises a pair of opposed push rods 86 and 87 around which are coiled tension springs 88 and 89, respectively. The rods 86 and 87 are both supported from the side of the carriage 6 by depending hangers 90 for the rod 86 and a somewhat different arrangement for the rod 87. Describing first the hangers 90, it will be seen that they provide spaced bearings 91 and 92 in which the rod 86 is journalled, the spring 88 being coiled around the rod between the bearing. One end of the rod 86 is made with an enlarged diameter 93 and the opposite end carries flanged head 94. The shoulder 95 on the head produces a stop for the rod 86 and prevents the same from moving toward the cross pin 96 on the limit switch. When the tapping tools reach the limit of the tapping operation, the carriage will have been moved into the position shown in Fig. 7 whereupon the limit switch will be tripped and the reverse or backing up half of the tapping cycle will commence. At the limit of both the tapping half and backing up half of the cycle the limit switch is tripped by either the rod 86 or the rod 87, depending upon the position of the carriage. As the carriage commences to move the tools toward the work the head 94 on the rod 86 abuts the latch 97, whereupon the movement of the rod is arrested although the carriage continues to move forward. As the threaded trip pin 98 wipes against the upstanding block 99 the latch 97 is retracted and the rod 86 is released and the built-up tension in the spring 88 impels the rod against the cross pin 96 hitting the same a hammer blow and snapping the switch and effecting reversal of the carriage. The same action results upon the movement of the carriage in the opposite direction. The spring 100 is coiled around the latch stem 101 and is confined in a bore 102 in the arm 103. The arm 103 is also made with a recess for the reception of the button 105 which is carried by the stem 101 to produce the desired tension on the spring 100.

The pin 98 is threaded in a holder 106 which is attached to the carriage, and a nut 107 is provided to hold adjustments of the pin.

The same identical actuating mechanism is provided for snapping the limit switch at the completion of the backing up half of the cycle, only instead of the supporting hanger 90′ being fixed to the carriage as is the hanger 90, it is mounted for swinging movement upon a pintle 108 which in turn is supported in the bearing 109 having an arm 110 which attaches the same to the carriage. The trip pin 98′ is also carried by the pintle 108 so that it too may swing with the other parts of the actuating mechanism.

A locking pin 111 which is carried by the extension part 112 of the hanger 90′ is arranged to seat in a recess 113 in the arm 110 to hold the hanger against relative movement about the pintle. By pulling out on the knurled head 114 against the influence of the spring 115, the pin 111 may be retracted from the recess 113 and thus leave the hanger free to swing about the pintle 108. In this manner the rod 87 may be held out of alignment with the trip rod 96. When the actuating mechanism on this side of the machine is thus moved out of active operating position, the carriage will feed rearwardly far enough to leave plenty of clearance to conveniently change the chucks or otherwise work on the tool end of the machine without interference.

Figure 1:
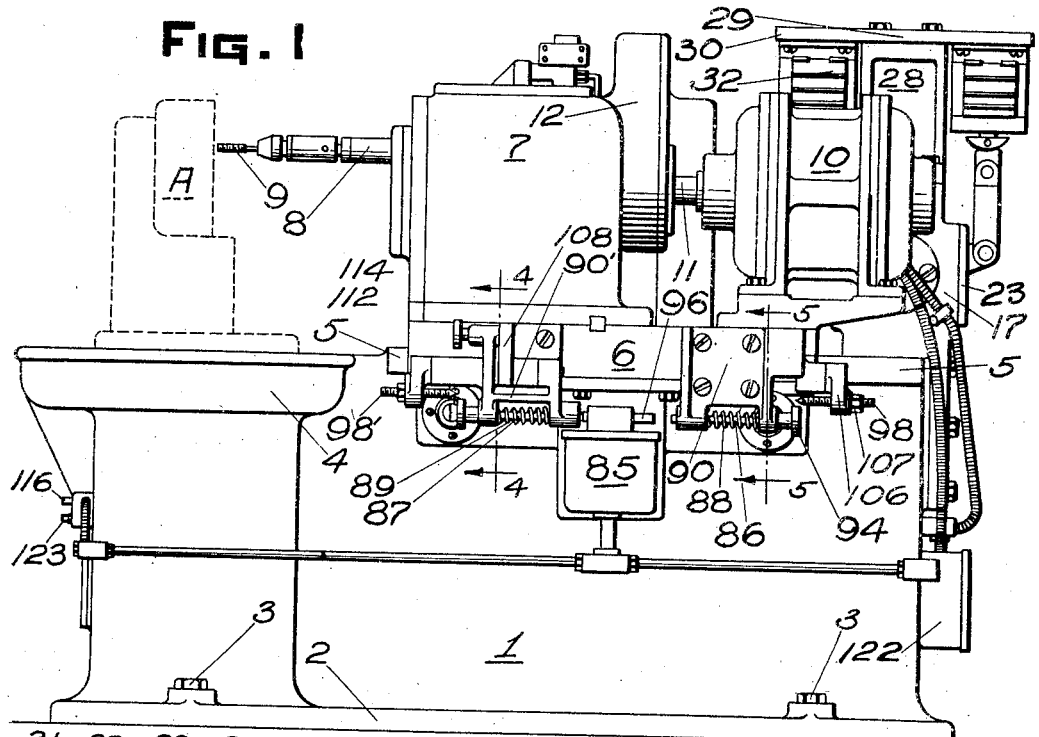
Figure 1 is a view in side elevation of a multiple tool tapping machine equipped with the invention.

In explaining the operation of the machine, reference will also be made to the wiring diagram in Fig. 15. With the work fixed on the work support or table, the operator will close the starting switch 116 which will energize the solenoid 117, thus closing the magnetic switch 118. It is to be understood that the actuating mechanism for the limit switch 85 is in a position as indicated in Fig. 1. The position of the limit switch diagrammatically illustrated in Fig. 15 corresponds to the position of the switch shown in Fig. 1. Simultaneously with the closing of the magnetic switch 118 the synchronizing switch 119 is closed energizing solenoid 32 which moves the nut 14 into the position shown in Fig. 9. The closing of the magnetic switch 118 starts the motor 10. Upon completion of the tapping half of the cycle the limit switch 85 is tripped which energizes the solenoid 120 closing the magnetic switch 121 which reverses the motor 10 and closes the synchronizing switch 122 energizing the solenoid 33. Energizing the solenoid 33 moves the nut 14 into the position shown in Fig. 10 which imparts a backward kick to the feed screw compressing the spring 76 as shown in Fig. 14 which puts a tension on the taps as they are backing out of the work. Just as soon as each tap completes the backing up half of its cycle, the spring 76 in each chuck being compressed will impart a quick pull to the tap, thus clearing it from the edge of the hole regardless of the position of the other taps.

When the carriage reaches the limit of its backing up feed the limit switch 85 is tripped, which opens the switches 121 and 122 cutting off the current and holding the line open until the starting switch 116 is closed.

The stopping switch 123 is employed to manually stop the machine at any time in the cycle of operation.

From the above it will be seen that the combination provides means for individually applying a retracting tension on the tools as they are backing out of the work, and, as a result, just as soon as they are clear of the first thread the spring will snap them back out of the way. The spring means in this respect is a recoil device with the feed nut serving as a trigger to collectively cock the springs and set them for separate application to the tools when the carriage is being pulled back by the feed screw.

It should be pointed out that the maximum stiffness of the springs 81 which cushion the tools during the tapping half of the cycle should exceed the maximum resistance encountered by the tools.

Having thus described and shown an embodiment of my invention, what I claim and desire to secure by Letters Patent of the United States, is:

1. In a tapping machine, the combination of a tool carriage, slideways on which the carriage is mounted for reciprocation a plurality of tools mounted on the carriage and collectively movable therewith, means for imparting a forward and reverse feed to the carriage, means for continuously rotating the tools during both forward and reverse feed of the carriage, means for reversing the direction of rotation of the tools upon reversal of the carriage feed and means for automatically applying axial retracting tension to the tools, comprising a separately acting recoil device for each tool and means for collectively setting said recoil devices by movement of the carriage.

2. In a tapping machine, the combination of a frame structure, slideways thereon, a carriage mounted upon said slideways, a tool head on the carriage, a plurality of tapping tools carried by said head, chucks for said tools, gearing in said head for driving said tools, a rotary feed screw for moving the carriage forward and reverse, an electric motor for rotating the feed screw and also rotating the tools, means for reversing the motor to reverse the direction of rotation of the tools and means for applying axial retracting tension individually to the tools when their direction of rotation is reversed, comprising a recoil spring in each of the tool chucks mounted to influence the axial movement of the tool relatively to the tool head, a feed nut in which the feed screw is threaded, a mounting in which said nut is axially movable and means for imparting an axial thrust to said nut, whereby the initial tension of said spring will be increased in the direction of the reverse feed of the carriage.

3. In a tapping machine, a frame, slideways on the frame, a carriage mounted for reciprocation on said slideways, a tool head on the carriage, a plurality of tapping tools projecting from said head, a feed screw for reciprocating the carriage, a motor for rotating the tapping tools and driving the feed screw, and means for automatically controlling the operation of the carriage and the rotation of the tools, comprising a limit switch for reversing the motor at the limit of both the tapping half of the operating cycle and the backing up half of the cycle; whereby the direction of rotation of the tools will be reversed and the direction of the feed of the feed screw will be reversed; a feed nut on the feed screw a mounting in which said nut is axially movable with the feed screw, means for imparting an axial thrust to the nut upon reversal of the feed screw and means tensioned by the thrust imparted to the nut and feed screw for applying a retracting tension individually to the tools when the same are backing out of the work.

4. In a tapping machine, a frame, slideways on the frame, a carriage mounted for reciprocation on said slideways, a tool head on the carriage, a plurality of tapping tools projecting from said head, a feed screw for reciprocating the carriage, a motor for rotating the tapping tools and driving the feed screw, and means for automatically controlling the operation of the carriage and the rotation of the tools, comprising a limit switch for reversing the motor at the limit of both the tapping half of the operating cycle and the backing up half of the cycle; whereby the direction of rotation of the tools will be reversed and the direction of the feed of the feed screw will be reversed; a feed nut on the feed screw, a mounting in which said nut is axially movable with the feed screw, solenoid actuated means controlled by the limit switch for imparting an axial thrust to the nut upon reversal of the feed screw and means tensioned by the thrust imparted to the nut and feed screw for applying a retracting tension individually to the tools when the same are backing out of the work.

5. In a multiple spindle tapping machine, a carriage, means for imparting forward and return translation to the carriage, a plurality of tap spindles carried by said carriage, tap chucks driven by said spindles, a forward and reverse drive in the carriage for said spindles, tap retracting springs in said chucks and means operable independently of the drive for the spindles for applying tension collectively to said springs.

6. In a multiple spindle tapping machine, a carriage, means for imparting forward and return translation to the carriage, a plurality of tap spindles carried by said carriage, tap chucks driven by said spindles, a forward and reverse drive in the carriage for said spindles, tap retracting springs in said chucks and means operable in conjunction with the translation of the carriage and independently of the drive for the spindles for applying tension collectively to said springs.

7. In a tapping machine, the combination of a frame structure, slideways thereon, a tool head mounted to slide on said slideways, a feed screw and feed nut for sliding said head, tap spindles carried by said head, constant mesh gearing in said head for driving said spindles, a main drive shaft for said gearing, a motor for said shaft, means for driving the feed screw off the said gearing in the head, means for reversing said motor to reverse the spindle drive and the feed screw, tool chucks for said spindles, a spring recoil device for each of said tool chucks, and means for automatically imparting a backward pull to the tool head after the completion of the tapping half of the operating cycle of the machine to collectively tension the spring recoil devices for the tool chucks.

Signed at Rockford, in the county of Winnebago, and State of Illinois, this 18th day of July, 1929.

ARTHUR H. LYON.